United States Patent [19]

Brown

[11] Patent Number: 5,003,759
[45] Date of Patent: Apr. 2, 1991

[54] BRUSH MOWER

[75] Inventor: John C. Brown, Goffstown, N.H.

[73] Assignee: JCB Leasing Corp., Weare, N.H.

[21] Appl. No.: 454,696

[22] Filed: Dec. 21, 1989

[51] Int. Cl.$^5$ .................. A01D 25/08; A01D 35/24
[52] U.S. Cl. ........................ 56/249; 56/255; 56/504
[58] Field of Search ................ 56/249, 249.5, 251, 56/255, 294, 12.7, 504; 172/45

[56] References Cited

U.S. PATENT DOCUMENTS

| 2,691,262 | 10/1954 | Swertfeger | 55/118 |
| 3,754,603 | 8/1973 | Bogie | 172/45 |
| 4,041,996 | 8/1977 | Grover | 144/2 |
| 4,259,834 | 4/1981 | Lambert et al. | 56/504 |
| 4,338,985 | 7/1982 | Smith et al. | 144/34 R |
| 4,680,922 | 7/1987 | Arnold | 56/249 X |
| 4,683,924 | 8/1987 | Cornelius | 56/504 X |
| 4,899,522 | 2/1990 | Munger | 56/255 X |

Primary Examiner—Thuy M. Bui
Attorney, Agent, or Firm—Lee A. Strimbeck

[57] ABSTRACT

A brush mower head adapted to be carried by an articulating crane comprises:
(1) a casing, adapted to be mounted to a crane
(2) a motor carried by the casing, and
(3) a drum with a center shaft mounted for rotation in the casing and powered by the motor, the axis for rotation in the drum in use being generally parallel to the ground. The drum is a cylinder having a length at least twice its diameter and has at least two hammer shafts running end to end parallel to the axis of rotation and being in balanced relationship one to another to minimize rotational imbalance of the drum. Hammers are mounted on the hammer shafts for free rotation thereabout in each of said wells. The hammers when the drum is rotating for mowing protrude by a centrifugal force beyond the surface of the cylinder and present a cutting edge to the brush being engaged.

11 Claims, 4 Drawing Sheets

BRUSH MOWER

The present invention is concerned with a mower for clipping brush, for example, brush under a power line. It is more particularly concerned with a unique and effective brush mower or chipper head carried by an articulating rotating crane on a transporter or tractor.

INTRODUCTION

Removing brush from under power lines and from other areas in preparation for farming or building can be quite time consuming and expensive. Hand labor with burning of the brush can be used to do this where burning is not prohibited. Removal by hand especially in rough, remote terrain is costly. Chemical herbicides can be used to destroy brush. The use of herbicides is now strongly disfavored if not prohibited by many communities.

Brush cutting mowers of one kind or another have heretofore been proposed but have not come into general use for a variety of reasons—expense, reliability, poor performance. Previous brush removing machines have proved to be ungainly, mechanically complex, subject to breakdown, inefficient or ineffective.

BACKGROUND PRIOR ART

The following United States patents show various designs that have been developed in the past.

| No. | DATE | INVENTOR | ASSIGNEE |
| --- | --- | --- | --- |
| 2,691,262 | 10/12/54 | Swertfeger | |
| 3,754,603 | 8/28/73 | Bogie | |
| 4,041,996 | 8/16/77 | Grover | Ram Industries |
| 4,259,834 | 4/7/81 | Lambert, e.a. | USA - Sec. of Agric. |
| 4,338,985 | 7/13/82 | Smith e.a. | Georgia Pacific Corp. |

None of these show or suggest the mowing head design of the present invention. Some are dual purpose, U.S. Pat. No. 4,041,996 supposedly can be used to chew up brush besides eradicating stumps. U.S. Pat. No. 4,259,834 is of interest because of its discussion of prior art devices.

THIS INVENTION

There has been a desideratum for a brush clearing machine or device that above all is mechanically reliable, effective and efficient. The present invention has been developed to meet this need.

Whereas for the normal the brush encountered under a power line in the northeastern United States it may cost as much as $1,000.00 an acre to remove it by hand at a rate of one to two acres per day with a crew of 6, the present invention will clear the same brush at a cost of approximately $200.00 (1989 costs) per acre and at a rate of four or more acres per day with two persons, an operator and an assistant. Mechanically, the machine is designed to be extremely resistant to wear and abuse to minimize the need for down time and repairs.

In brief compass, the present invention is a brush chipper or mower head adapted to be carried by a commercially available articulating rotating tractor-carried crane. The head comprises a casing, a hydraulic motor carried by the casing and a drum with a center shaft mounted for rotation in the casing and powered by the motor, the axis of rotation of the drum in use being generally parallel to the ground and parallel to the line of sight of the operator in the crane cab.

In particular, the drum is a metallic cylinder or length of pipe preferably having an outside diameter (O.D.) of at least 20 inches and having a length at least twice its diameter. The drum carries at least two hammer shafts running end to end parallel to the axis of rotation of the drum. The hammer shafts are in a balanced relationship one to another to minimize rotational imbalance of the drum. The drum has interior circular reinforcing plates and end plates perpendicular to the axis of rotation and firmly welded to the inner wall of the cylinder to prevent the rotational forces from causing bulging and distortion of the drum which may be designed to rotate at a speed of 1000 to 2000 rpm or so.

The drum carries a series of spaced apart outwardly facing interior semi-circular pockets about each of the hammer shafts. Each pocket is enclosed by side walls and a semi circular back wall affixed to the inner wall of the drum. The pockets associated with any one hammer shaft are off set from those of another hammer shaft. Preferably there are at least 4 hammer shafts carried by the drum and with the off sets there is 100 percent utilization of the length of the drum for contacting and chipping or cutting brush.

There is a knife or hammer mounted on the hammer shafts in each of the pockets for rotation therein. Preferably there are at least 6 hammers per shaft. Each knife usually will weigh at least 5 pounds and has a cutting edge facing in the direction of rotation of the drum and parallel to the axis of rotation of the drum. When the drum is rotating these hammers are held by centrifugal force outwardly on the radii of the drum and extend beyond the surface of the drum such that the cutting edges contact the brush. If a solid object such as a stone is encountered by any one hammer the hammer is free to rotate backwards relative to the direction of rotation of the drum into the pocket and thus free itself from the stone. It should be noted, however, considering the massiveness of the hammers and of the drum that if the operator inadvertently encounters ledge the hammers will do a pretty good job of chipping it away in a short period of time. Nevertheless, the hammers are made of hardened steel and will take a good amount of abuse before having to be replaced or resharpened.

The hammers may be made with two edges, one forward facing and one rearward facing. As the forward facing edge becomes dull the hammer can simply be reversed on the hammer shaft so that the unused cutting edge will then face in the cutting direction. The design of the mowing head is such that the hammers can be replaced quickly and easily.

The drum ends have rotatable locking plates having openings mating with the hammer shafts so that the hammer shafts can be inserted through the rotatable plate with the plate then being rotated and locked out of register to hold the hammer shafts in place. It is thus a relatively simple matter when one desire to turn the hammers about or to replace them to rotate the locking plate into alignment with the hammer shafts and to knock out the hammer shafts therethrough.

THE DRAWINGS

In the drawings.

Throughout the drawings the same parts have the same numbers.

DESCRIPTION

Figure 1:
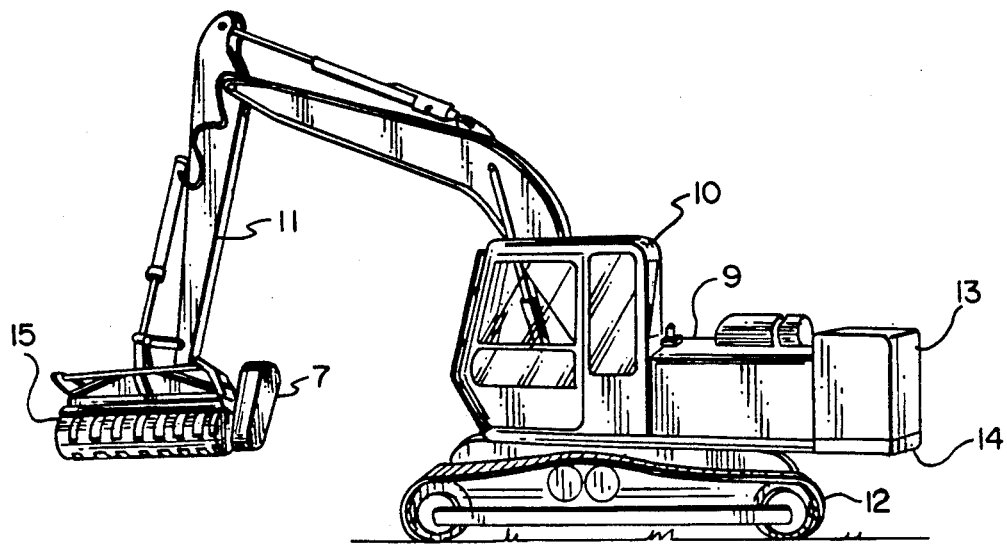
FIG. 1 is a view of a tractor carried articulating rotating crane modified to have an auxiliary power unit and to carry the mowing head of this invention.

Referring to FIG. 1, shown is a conventional articulating crane. It consists of a power unit 9, a cab 10 and a crane 11 carried on a self propelled tractor unit 12. It has been modified in as much as the usual counter weight has been replaced by an auxiliary air cooled diesel powered hydraulic pump 13 having a hydraulic reservoir 14 as part of the bottom support.

Figure 2:
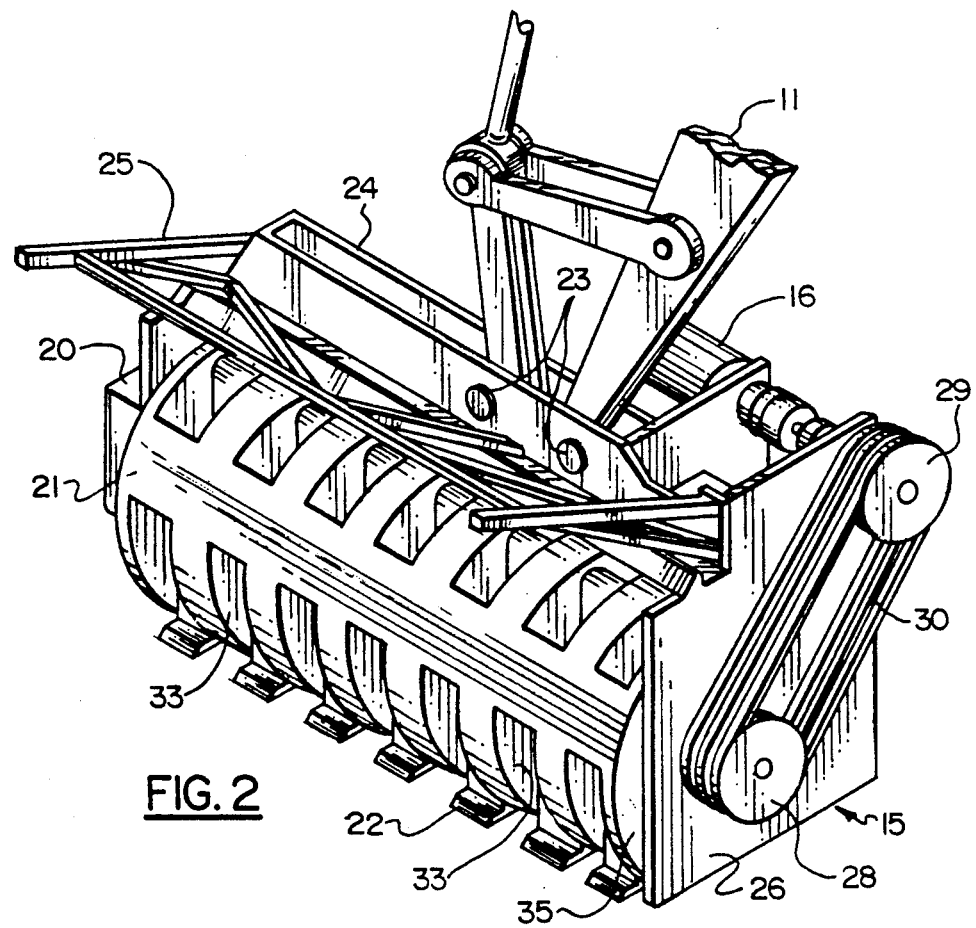
FIG. 2 is a perspective view of the mowing head with the pully housing removed.
Figure 3:
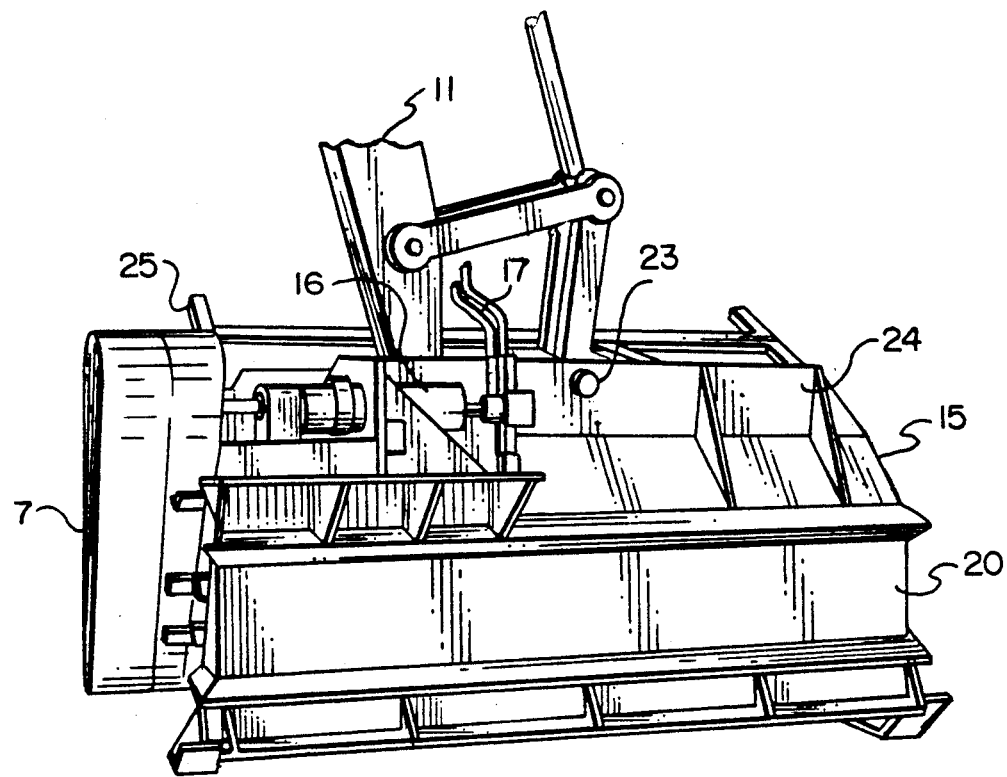
FIG. 3 is a view of the back of the mowing head.
Figure 8:
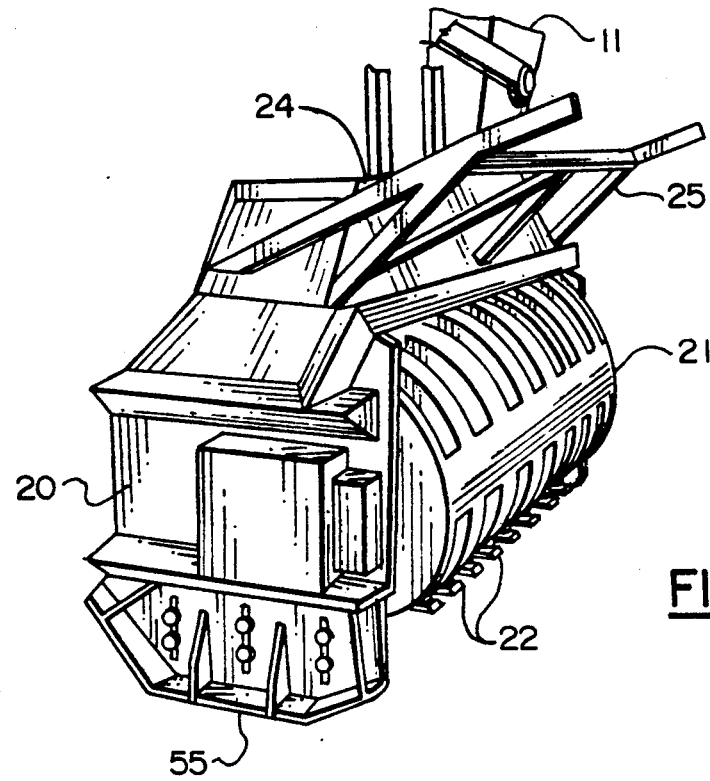
FIG. 8 is a perspective side elevational view showing the mower head at rest.

The mowing head 15 of this invention is mounted at the end of the crane 11. The mowing head hydraulic motor 16 is connected by suitable hydraulic lines 17 (See FIG. 3; not shown FIGS. 2 and 8) to the hydraulic power unit 13. The control of the hydraulic power to the mower head 15, the positioning of the crane arm and the travel of the carriage 12 are all accomplished in the known manners that need not be explained.

An auxiliary power unit 13 is used to supply the power to the mowing head in as much as it was found that if power unit 9 of the crane was used to power the mowing head it was difficult to accomplish both travel of the crane and adequate powering of the mower head. By the present design the crane can creep forward in constant motion and swing the mowing head from side to side, up and down and tilted as may be required without loss of power to the mowing head.

Turning now to FIGS. 2, 3, 4 and 8, shown is a casing 20 that semi encloses the rotating drum 21 carrying the hammers 22. The casing 20 has mounting brackets or pins 23 that are offset towards one end to compensate for the gyroscopic effect of the rotating drum 21. The mounting brackets 23 are attached to suitable attachment plates 24 on the casing which also lend rigidity to the casing. Sway braces 25 may be used to add further rigidity.

Casing 20 has end plates 26 that carry the center shaft 27 of the drum in suitable bearings 8. As illustrated the hydraulic motor 16 for the mowing head 15 is connected by pulleys 28 and 29 and belt 30 to the shaft 27 for the rotating drum. It may designed for example to drive the drum at a speed of 1800 rpm. The belts and pullies are normally covered by a housing 7.

The mowing head will usually weigh more than 1500 pounds. For example, the casing 20 and its support mechanism may have a weight of approximately one ton and the rotating drum and its hammer shafts etc., may have a weight of about one ton so that the total weight of the mowing head is about 2 tons. It can be appreciated that a substantial crane is required to handle the mowing head. In service, the axis of rotation of drum 21 is generally parallel to the ground with the end of the casing having the hydraulic motor facing the operator in the cab i.e., the axis of rotation is in line with his line of vision and is not perpendicular thereto, although so positioning the mowing head is not precluded. However, having the axis of rotation in line with the line of vision is preferred for safety reasons—anything thrown by the drum is thrown to the sides and not at the operator.

Figure 4:
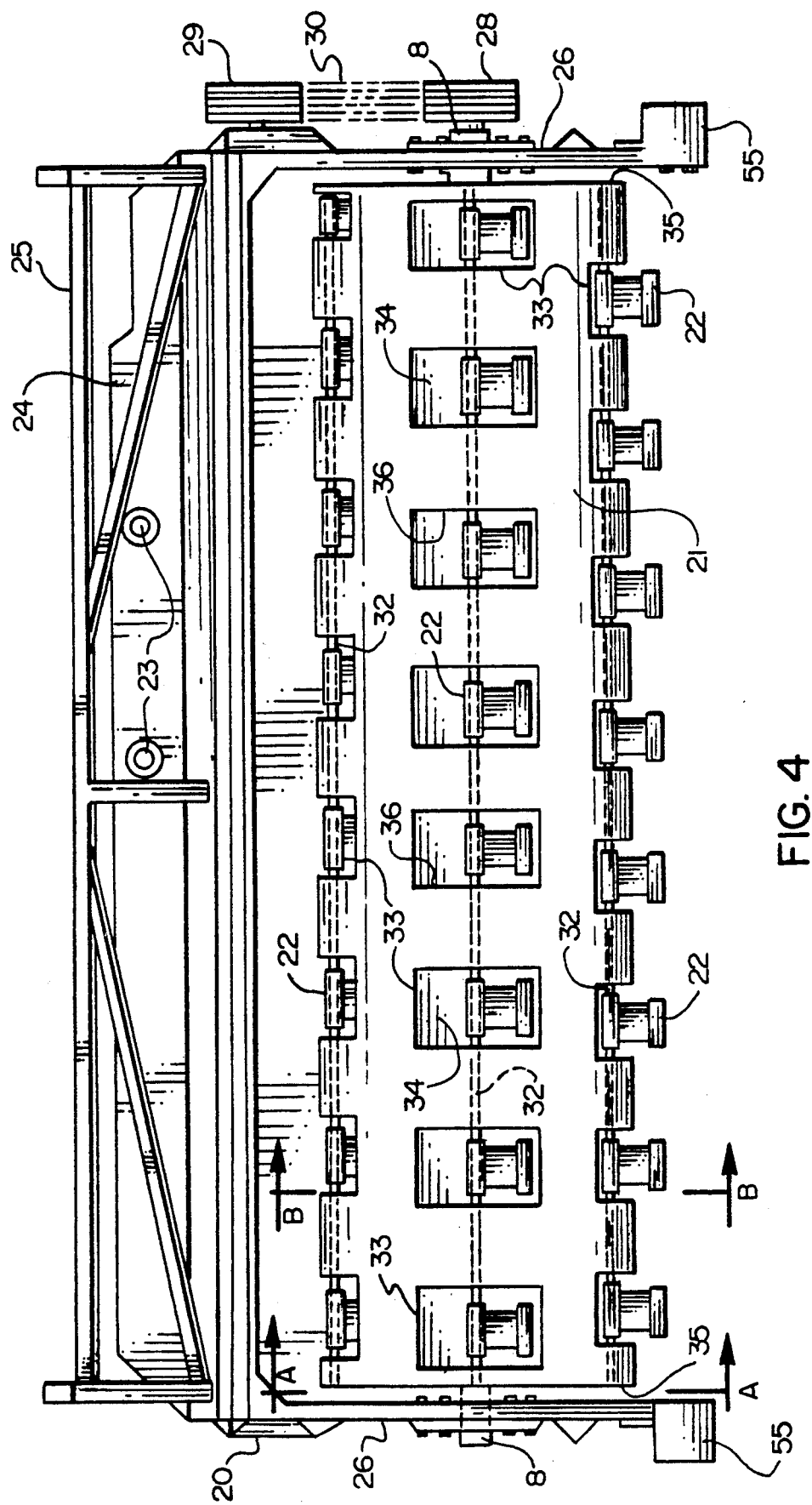
FIG. 4 is an elevational front view of the mowing roll or drum.
Figure 5:
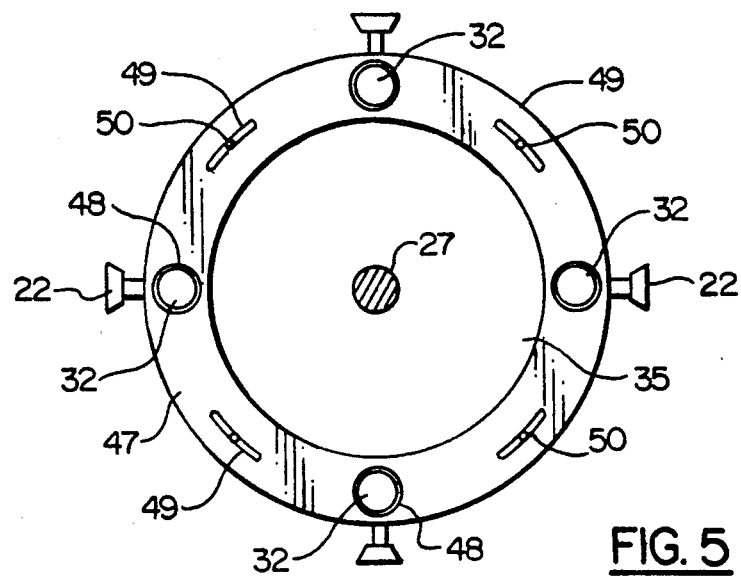
FIG. 5 is an end view of the drum taken along line A—A of FIG. 4.
Figure 6:
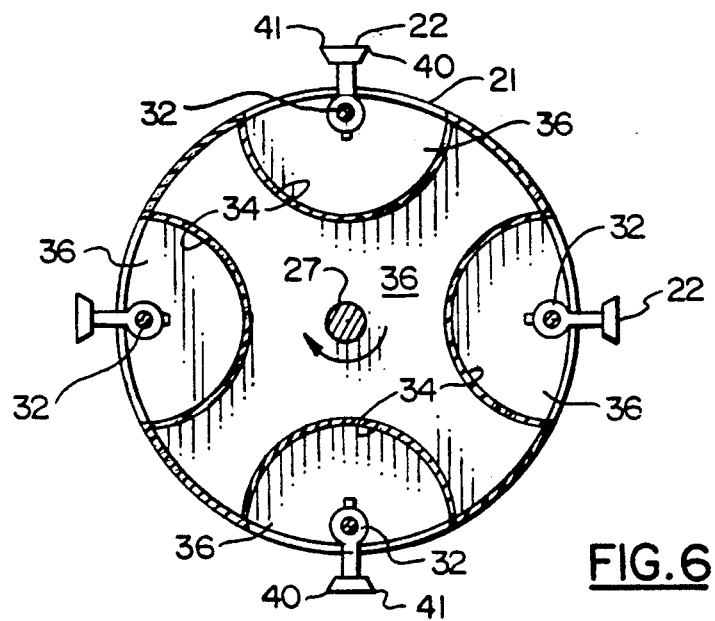
FIG. 6 is a cross sectional view of the drum taken along line B—B of FIG. 3, the end and sectional views being illustrated as if the hammers were being held outwardly by centrifugal force.

With reference to FIGS. 4, 5, and 6, the rotating drum 21 consists of a steel cylinder such as a pipe 24 inches O.D. carrying at least 2 and preferably 4 hammer shafts 32. These may be steel rods 1⅜inch in diameter running through the length of the drum 21 and through hammer pockets 33 in the drum.

Along the line of each hammer shaft 32 is a series of hammer pockets 33—8 as illustrated for each hammer shaft. These hammer pockets are each enclosed with a semicircular back wall 34 such as for example an approximately semi-circular section cut form a 12 inch pipe and welded to the internal wall of drum 21. Each side of a pocket 33 is enclosed by steel plates 36 which in part helps to support hammer shaft 32. Each end of drum 21 is enclosed and reinforced with a heavy circular plate 35 which hold the bearings 8 for shaft 27 of the drum. The drum is internally reinforced with interior plates 36 securely welded to the interior wall of drum 21 and to such of the back walls 34 that they encounter. For a drum 6 feet in length such enforcement plates can be spaced 2 feet apart about the center line of the drum. They prevent bulging of the drum as it rotates at high speed.

Figure 7:
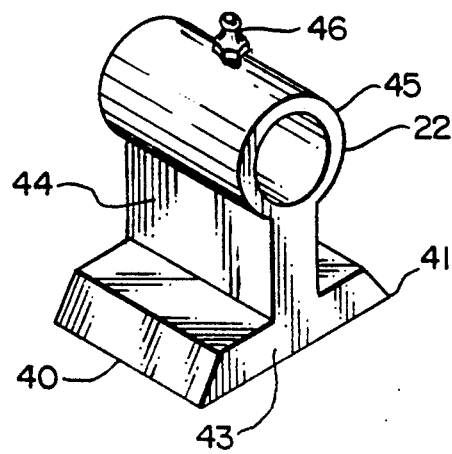
FIG. 7 is a perspective view of one of the hammers or knives used in the present invention.

To describe the hammer or cutting knives in more detail, reference is made to FIGS. 6 and 7. A knife 22 has a cutting edge 40 facing in the direction of rotation of the drum indicated by the arrow. While it can have only a single cutting edge it is convenient to make the knife or hammer 22 with a forward 40 and rear 41 facing cutting edges symmetrically balanced about the center line of the knife 22. Thus as knife edge 40 dulls the hammer can be reversed on the shaft and edge 41 brought into play. The edges 41 are at the outside ends of the hammer 43 which is firmly affixed by a perpendicular leg 44 to a knuckle or bearing 45 which attaches the hammer to a hammer shaft 32. Knuckle 45 may have a grease fitting 46.

Other shapes of cutting knives can of course be used. It can be appreciated that a feature of this invention is that each cutting knife in its individual pocket is free to rotate in that pocket about the hammer shaft so that it can swing clear of any obstacles that may be encountered. The hammer shafts are of course enclosed so that cutting debris and the like will not work its way into the interior of the drum and cause an imbalance. As the drum 21 is put in operation and taken out of operation the hammers will as the drum slows down and speeds up swing around the pockets cleaning them out. When cutting, centrifugal force will throw any material out of the pockets 33 that should happen to find its way in.

With reference to FIG. 5 the easy removal of hammer shafts 32 is effected by providing for locking rings 47 on either end of the drum to hold the hammer shafts in place. Each of the two locking rings have openings 48 that register with the 4 hammer shafts 32. They have circumferential locking slots 49 with locking pins 50 therein. After the hammer shafts are inserted through the locking rings and the ends of the hammer shafts brought into register with the end plates 35 of the drum, the locking rings are rotated so that the openings 48 are out of register with the ends of the hammer shafts 32 and then are locked in place by tightening pins 50. To remove the hammer shafts 32 and thus hammers 22 the locking rings are rotated to be in register and the shafts 32 are simply knocked out.

To support the mowing head when it is not attached to the crane and to allow it to be worked on the end walls of casing 20 can have shoes or skids 55.

What is claimed is:

1. A brush mower head adapted to be carried by an articulating traveling crane comprising:
   a casing, adapted to be mounted to said articulating traveling crane for travel over ground to be cleared;
   a motor carried by said casing; and
   a drum with a center shaft mounted for rotation in said casing about an axis of rotation and powered by said motor, said axis of rotation of said drum in use being generally parallel to said ground;
   said drum:
      being a cylinder having an inner wall and a length at least twice its diameter;
      having at least two hammer shafts running end to end parallel to said axis of rotation and being in balanced relationship one to another to minimize rotational imbalance of said drum,
      having interior circular reinforcing plates and end plates perpendicular to said axis of rotation and connected to said inner wall of said cylinder, said end plates having outer surfaces,
      having a series of spaced apart outward facing interior semicircular plates about said hammer shafts affixed to said inner wall and to which of said reinforcing plates as are contiguous thereto, said semicircular plates defining wells about said hammer shafts,
      being slotted at said wells, with slots associated with one hammer shaft being offset along the axis of said cylinder from those of another hammer shaft;
      having hammers, each with a cutting edge and mounted on said hammer shafts for free rotation thereabout in each of said wells, said hammers when said drum is rotating for mowing protruding by centrifugal force through said slots beyond the surface of said cylinder and presenting the cutting edge of each of said hammers to the brush being engaged; and
      being dynamically balanced for rotation at at least 1,000 rpm.

2. The brush mower head of claim 1 wherein said hammer shafts extend to said outer surfaces of said end plates and including in addition a circular locking plate on said outer surface of one of said end plates, said end plates and circular locking plate having openings registering with said hammer shafts to permit insertion and removal of said hammer shafts and said circular locking plate being adapted to be rotated out of register and secured to said one of said end plates to hold said hammer shafts in place.

3. The brush mower head of claim 1 wherein said motor is a hydraulic motor connected by a belt to a pulley affixed to said center shaft.

4. The brush mower head of claim 3 wherein said casing and drum together weigh at least 1500, pounds said drum has a diameter of at least 20 inches, and each of said hammers weigh at least 5 lbs.

5. The brush mower head of claim 4 wherein there are four said hammer shafts, one each mounted centrally in a quadrant of said cylinder and there being at least 6 of said hammers mounted on each of said hammer shafts, said slots associated with one hammer shaft being offset from those of another hammer shaft so that 100 percent of the length of said drum is available for mowing.

6. A brush mowing head comprising:
   a casing;
   a motor carried by said casing; and
   a drum with a center shaft mounted for rotation in said casing about an axis of rotation and powered by said motor;
   said drum:
      being an elongated cylinder having a circular wall and a length at least twice its diameter;
      having at least two hammer shafts running end to end parallel to said axis of rotation and being in balanced relationship one to another to minimize rotational imbalance of said drum;
      having a series of uniformly spaced outwardly facing semicircular pockets about each of said hammer shafts, each said pocket having side walls and a semicircular back wall affixed to said circular wall of said cylinder, with said pockets associated with one hammer shaft being offset of those of another hammer shaft; and
      having knives in each of said pockets mounted for rotation therein on said hammer shafts, each said knife having a cutting edge facing in the direction of rotation of said drum and parallel to said axis of rotation and extending beyond the surface of said drum under the influence of centrifugal force in operation.

7. The brush mowing head of claim 6 wherein said elongated cylinder has at each end end plates attached thereto and at least two spaced apart reinforcing plates perpendicular to said axis of rotation interiorly of said end plates, said reinforcing plates being affixed to said circular wall and to one or more of said semi-circular back walls as required.

8. A brush mower comprising:
   a carrier platform;
   an articulating rotating crane and a auxiliary power unit carried by said carrier platform; and
   a brush mowing head carried by said articulating crane, said mowing head being powered by said auxiliary power unit and comprising:
   a casing, adapted to be mounted to a crane for travel over ground to be cleared;
   a motor carried by said casing; and
   a drum with a center shaft mounted for rotation in said casing about an axis of rotation and powered by said motor, said axis of rotation of said drum in use being generally parallel to said ground;
   said drum;
   being a cylinder having an inner wall and a length at least twice its diameter;
   having at least two hammer shafts running end to end parallel to said axis of rotation and being in balanced relationship one to another to minimize rotational imbalance of said drum,
   having interior circular reinforcing plates and end plates perpendicular to said axis of rotation and connected to said inner wall of said cylinder, said end plates having outer surfaces, having a series of spaced apart outward facing interior semi circular plates about said hammer shafts affixed to said inner wall and to which of said reinforcing plates as are contiguous thereto, said semi circular plates defining wells about said hammer shafts, being slotted at said wells, with the slots associated with one hammer shaft being offset along the axis of said cylinder from those of another hammer shaft;

having hammers mounted on said hammer shafts for free rotation thereabout in each of said wells, said hammers when said drum is rotating for mowing protruding by centrifugal force through said slots beyond the surface of said cylinder and presenting a cutting edge to the brush being engaged; and being dynamically balanced for rotation at at least 1000 rpm.

9. The brush mower of claim 8 wherein said carrier platform travels on tracks powered and controlled independently of said auxiliary power unit.

10. The brush mower of claim 8 wherein said auxiliary power unit is an air cooled diesel engine operating a hydraulic pump which is connected to said motor, said motor being a hydraulic motor.

11. The brush mower of claim 8 wherein said mower head is mounted to said crane for pivoting and tilting by hydraulic activation, the point of suspension of said brush mower head being selected to compensate for gyroscopic affect and not being on the vertical center line of said chipper head.

* * * * *